(12) United States Patent
Kawakami

(10) Patent No.: US 7,728,935 B2
(45) Date of Patent: Jun. 1, 2010

(54) LIQUID CRYSTAL DEVICE AND METHOD FOR MANUFACTURING THE SAME

(75) Inventor: Yasushi Kawakami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 12/070,399

(22) Filed: Feb. 19, 2008

(65) Prior Publication Data

US 2008/0212004 A1  Sep. 4, 2008

(30) Foreign Application Priority Data

Feb. 21, 2007  (JP) ............... 2007-040427

(51) Int. Cl.
*G02F 1/1337* (2006.01)
(52) U.S. Cl. .............. 349/125; 349/123; 349/124
(58) Field of Classification Search ............ 349/123, 349/124, 125
See application file for complete search history.

(56) References Cited

U.S. PATENT DOCUMENTS

| 7,027,114 B2 * | 4/2006 | Kim et al. ............... 349/106 |
| 2004/0095537 A1 * | 5/2004 | Akagi et al. ............ 349/123 |
| 2007/0019141 A1 * | 1/2007 | Kizu et al. ............. 349/123 |

FOREIGN PATENT DOCUMENTS

JP   2006-195111   7/2006

* cited by examiner

*Primary Examiner*—Richard H Kim
(74) *Attorney, Agent, or Firm*—AdvantEdge Law Group, LLC

(57) ABSTRACT

There is provided a liquid crystal device including a first substrate, a second substrate, a liquid crystal being held between the first substrate and the second substrate, a base layer having alternating linear grooves and linear protrusions on at least one of the first substrate and the second substrate, and an alignment layer of an oxide film covering the base layer and having wedge-shaped tops over the linear protrusions of the base layer.

5 Claims, 7 Drawing Sheets

LIQUID CRYSTAL DEVICE AND METHOD FOR MANUFACTURING THE SAME

BACKGROUND

1. Technical Field

The present invention relates to a liquid crystal device in which a liquid crystal is held between a first substrate and a second substrate and a method for manufacturing the same. More specifically, the present invention relates to a technique for forming an alignment layer with an inorganic material.

2. Related Art

In a liquid crystal device, a liquid crystal is held between a first substrate and a second substrate, and an alignment layer is disposed on the surfaces of the first and the second substrates in order to impart an alignment to the liquid crystal. The alignment layer is made of an organic film such as a polyimide film and is provided with a plurality of fine lines on the surface thereof by rubbing treatment. However, an alignment layer made of an organic material is low in reliability, and accordingly an alignment layer made of an inorganic material formed by oblique deposition or ion-beam synthesis is recently being investigated.

Furthermore, an alignment layer formed by roughening the surface of a polymer base film and forming Diamond-Like-Carbon thereon is also proposed (refer to, for example, JP-A-2006-195111).

However, the alignment layer formed by the oblique deposition or the ion-beam synthesis is porous and thereby absorbs moisture to readily cause problems. Consequently, it is required to enlarge the seal cross-section for preventing the problems. This requirement causes an increase in size and a decrease in productivity of a liquid crystal device.

In a case of an alignment layer formed by roughening the surface of a polymer base film and forming Diamond-Like-Carbon thereon, there are problems such that the roughness of the base film cannot sufficiently function because of the Diamond-Like-Carbon and the pretilt angle of the liquid crystal varies. These problems disadvantageously cause a decrease in contrast. in particular, in a case that an IPS (in-Plane Switching) or an FFS (Fringe-Field Switching) in which the alignment of liquid crystal molecules is controlled by an electric field in the lateral direction is employed, black luminance in the horizontal and vertical directions and in the oblique direction is increased with the pretilt angle to deteriorate the contrast of a display.

SUMMARY

An advantage of some aspects of the present invention is to provide a liquid crystal device of which pretilt angle can be certainly controlled and of which reliability can be improved by using a novel inorganic material-based alignment layer.

In the liquid crystal device of the invention, a liquid crystal is held between a first substrate and a second substrate, a base layer having alternating linear grooves and linear protrusions on at least one of the first and the second substrates, and an alignment layer of an oxide film covering the base layer. The alignment layer has wedge-shaped tops over the linear protrusions of the base layer.

In the invention, the alignment layer is preferably formed by high-density plasma chemical vapor deposition.

In the invention, in a method for manufacturing the liquid crystal device in which a liquid crystal is held between a first substrate and a second substrate, an alignment layer is formed on at least one of the first and the second substrates. The method includes a first process of forming a base layer having altenativy linear grooves and linear protrusions and a second process of forming an oxide film to cover the base layer by high-density plasma chemical vapor deposition.

In the high-density plasma chemical vapor deposition (hereinafter referred to as HDPCVD), an oxide is synthesized from a raw material compound under conditions of a high plasma density, for example, at an electron density of $1\times10^9$ to $5\times10^{10}/cm^3$. This synthesized oxide is deposited, and simultaneously the film of the deposited oxide is partially etched by plasma. Accordingly, the oxide film formed so as to cover the base layer is deposited over and between the protrusions of the base layer. At the same time, corners of tops of the oxide film protruding upward compared to the periphery are scraped to form oblique faces. Consequently, an oxide film having wedge-shaped tops over the protrusions having a rectangular cross-section of the base layer is formed. This oxide film is used as the alignment layer. The shape of the alignment layer can be certainly controlled by conditions for forming the film by HDPCVD and the formation pattern of the base layer. Therefore, the alignment direction of the liquid crystal molecules can be certainly controlled, and also the pretilt angle can be certainly controlled. Consequently, the viewing angle characteristics and the contrast of the liquid crystal device can be improved. in addition, the oxide film (alignment layer) formed by HDPCVD is not deteriorated, unlike in organic films, and is non-porous, unlike in alignment layers made of an inorganic material formed by oblique deposition or ion-beam synthesis. Therefore, the reliability of the liquid crystal device can be improved.

In the invention, the base layer is, for example, a plurality of linearly arranged lines of base films having a rectangular cross-section.

In the invention, both the base layer and the alignment layer are preferably made of silicon oxide films. With such a configuration, the base layer and the alignment layer are each made of an inorganic material and thereby are stable and can impart reliability to a liquid crystal device.

In the invention, the base layer and the alignment layer may be provided to both the first and the second substrates.

The invention is preferably applied to an IPS mode liquid crystal device in which the alignment of liquid crystal molecules is controlled by an electric field in the lateral direction. in such a case, the first substrate is provided with pixel electrodes and common electrodes disposed on one insulating film. The alignment of the liquid crystal molecules is controlled by a lateral electric field between the pixel electrodes and the common electrode. in the IPS mode liquid crystal device, the black luminance in the horizontal and vertical directions and in the oblique direction is increased with the pretilt angle. According to the invention, the surface of the alignment layer has roughness and the shape thereof can be certainly controlled. Accordingly, the pretilt angle can be certainly decreased to improve the viewing angle characteristics and the contrast of an image.

In addition, the invention is preferably applied to an FFS mode liquid crystal device in which the alignment of liquid crystal molecules is controlled by an electric field in the lateral direction. in such a case, the first substrate is provided with pixel electrodes and common electrodes disposed in different layers with an insulating film interposed therebetween. The alignment of the liquid crystal molecules is controlled by a lateral electric field between the pixel electrodes and the common electrode. Similarly to in the IPS mode liquid crystal device, also in the FFS mode liquid crystal device, the black luminance in the horizontal and vertical directions and in the oblique direction is increased with the pretilt angle. According to the invention, the surface of the alignment layer has roughness and the shape thereof can be certainly controlled. Accordingly, the pretilt angle can be certainly decreased to improve the viewing angle characteristics and the contrast of an image.

The liquid crystal device to which the invention is applied can be used as a display of an electronic apparatus such as a mobile phone or a mobile computer or a light valve of a projection display system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
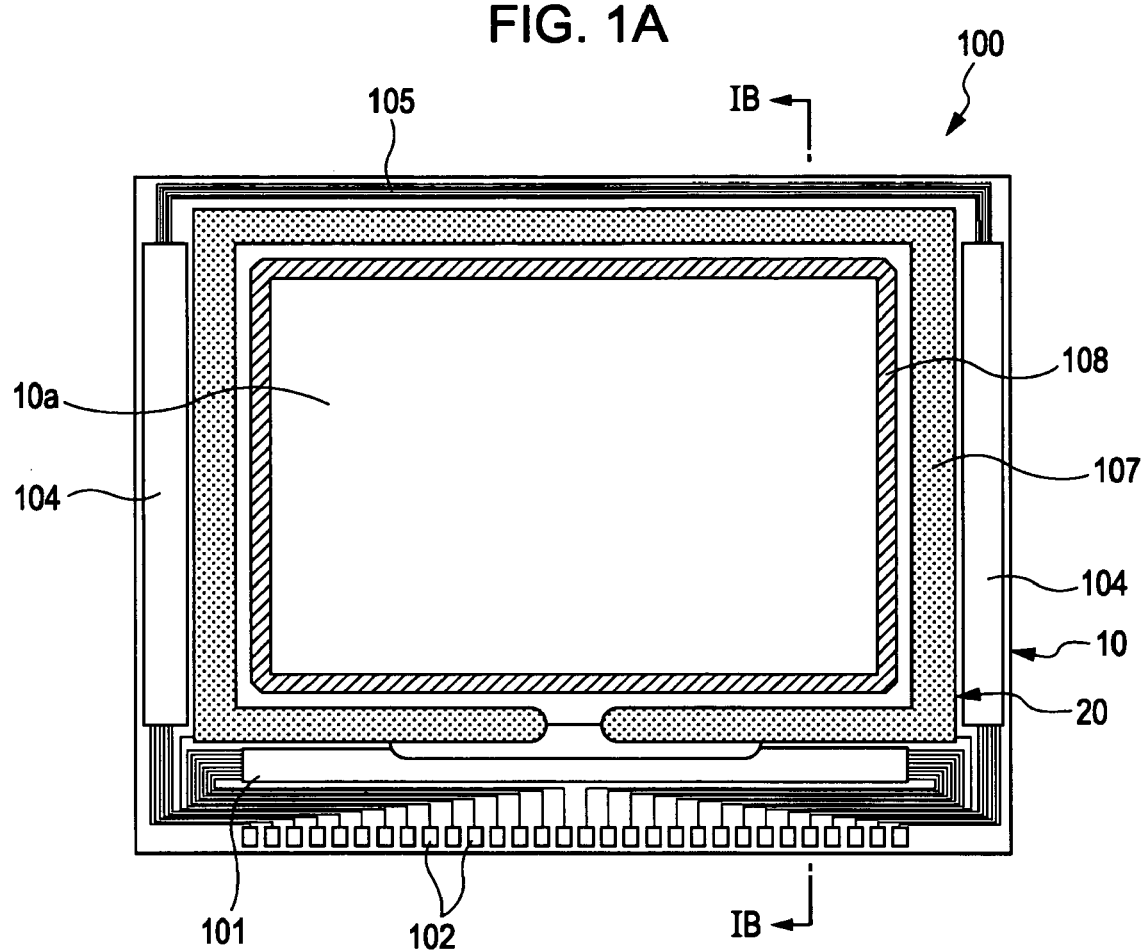
FIG. 1A is a plan view of a liquid crystal device to which the invention is applied and components of the device, viewed from a counter substrate side.
Figure 1B:
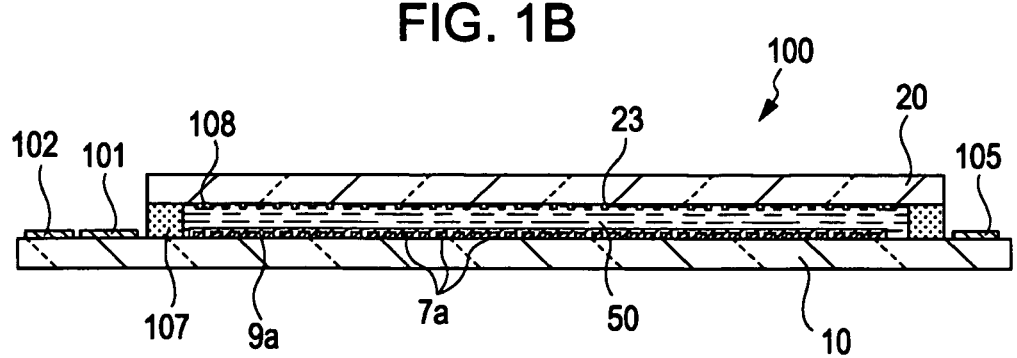
FIG. 1B is a cross-sectional view taken along the line IB-IB of FIG. 1A.

Embodiments of the invention will now be described. in the drawings referred to in the following description, the scale of each layer and each member is different in order to make each layer and each member large enough to be recognizable in the drawings. Total configuration FIG. 1A is a plan view of an IPS mode liquid crystal device to which the invention is applied and components of the device, viewed from a counter substrate side, and FIG. 1B is a cross-sectional view taken along the line IB-IB of FIG. 1A. The alignment layer is not drawn in FIG. 1B.

In FIGS. 1A and 1B, the liquid crystal device 100 in this embodiment is a transmission active matrix liquid crystal device. A seal material 107 is disposed on an element substrate 10 along the edges of a counter substrate 20. A data line-driving circuit 101 and mounting terminals 102 are disposed on the element substrate 10 in a region outside the seal material 107 along one side of the element substrate 10. Scanning line-driving circuits 104 are disposed on the element substrate 10 along two sides adjacent to the side where the mounting terminals 102 are arranged. A plurality of wirings 105 are disposed along the remaining side of the element substrate 10 for connecting between the scanning line-driving circuits 104 disposed at both sides of an image display region 10a. Furthermore, peripheral circuits such as a precharge circuit and a test circuit may be provided under a frame 108 or the like. The counter substrate 20 has substantially the same profile as that of the seal material 107 and is fixed to the element substrate 10 with this seal material 107. The element substrate 10 and the counter substrate 20 hold a liquid crystal 50 therebetween.

The element substrate 10 includes pixel electrodes 7a arrayed in a matrix form. The detail will be described below. The counter substrate 20 includes the frame 108 made of an insulating material disposed in the region inside the seal material 107. The inside of the seal material 107 is the image display region 10a. The counter substrate 20 may include a light-shielding film 23 called a black matrix or a black stripe in regions corresponding to the longitudinal and lateral boundary regions of the pixel electrodes 7a on the element substrate 10.

In the liquid crystal device 100 of this embodiment, the liquid crystal 50 is driven by an IPS mode. Accordingly, the element substrate 10 also includes common electrodes 9a, in addition to the pixel electrodes 7a, but the counter substrate 20 does not include counter electrodes. Detail configuration of liquid crystal device 100

Figure 2:
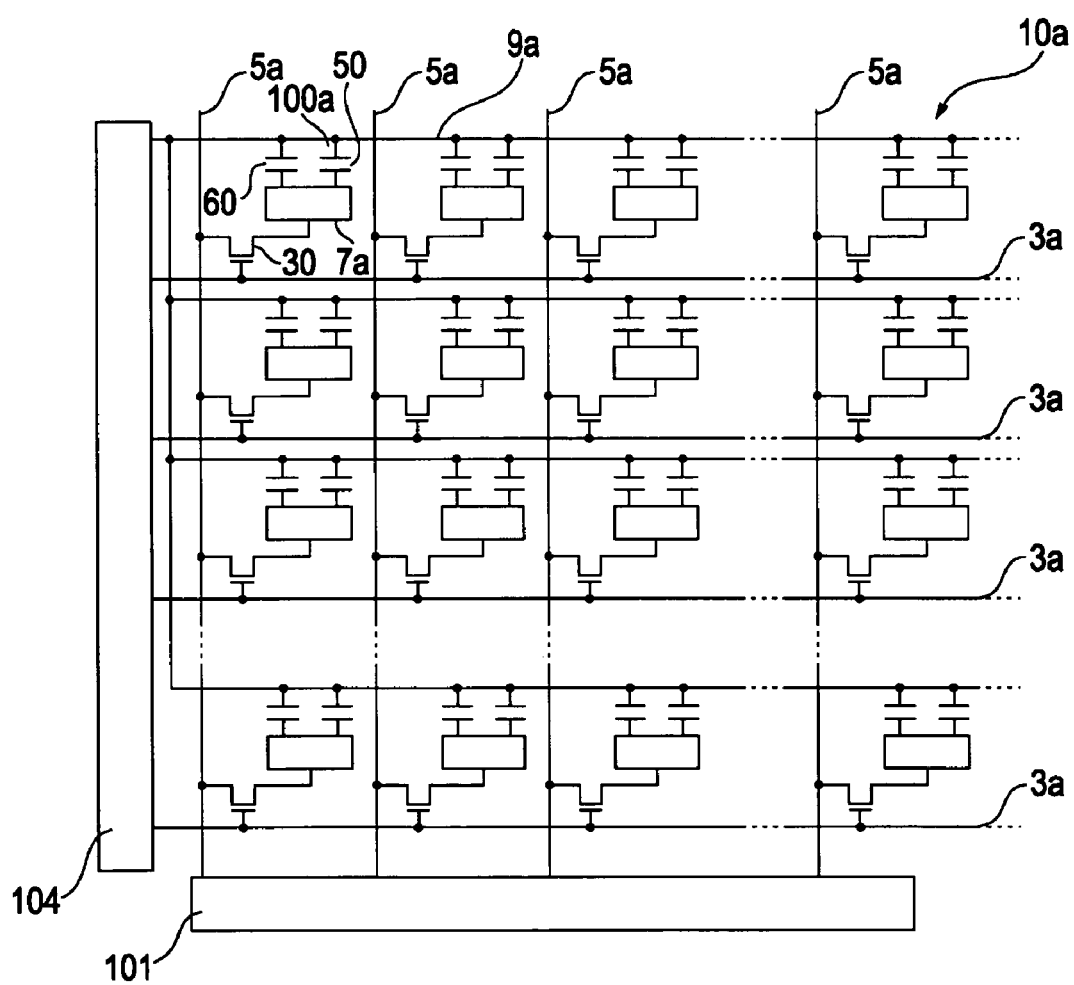
FIG. 2 is an equivalent circuit diagram illustrating an electrical configuration of an image display region of an element substrate that is used in a liquid crystal device to which the invention is applied.

With reference to FIG. 2, the configurations of the liquid crystal device 100 to which the invention is applied and an element substrate used in the device will be described. FIG. 2 is an equivalent circuit diagram illustrating an electrical configuration of the image display region 10a of the element substrate 10 used in the liquid crystal device 100 to which the invention is applied.

As shown in FIG. 2, a plurality of pixels 100a are arrayed in a matrix form in the image display region 10a of the liquid crystal device 100. Each of the plurality of pixels 100a includes a pixel electrode 7a and a thin-film transistor 30 as a pixel switching element for controlling the pixel electrode 7a. Data lines 5a supplying data signals (image signals) line-sequentially are electrically connected to sources of the thin-film transistors 30, and scanning lines 3a are electrically connected to gates of the thin-film transistors 30. The scanning lines 3a are applied with scanning signals line-sequentially in a predetermined timing. The pixel electrodes 7a are each electrically connected to a drain of the thin-film transistor 30 for switching ON the thin-film transistor 30 for a predetermined period of time to write a data signal supplied from the data line 5a to the pixel 100a in a predetermined timing. The pixel signal with a predetermined level that is thus written through the pixel electrode 7a in the liquid crystal 50 shown in FIG. 1B is retained for a certain period of time between with the common electrode 9a provided to the element substrate 10.

A storage capacitance 60 is formed between the pixel electrode 7a and the common electrode 9a. The voltage of the pixel electrode 7a is retained, for example, for a period of time three orders longer than that for the application of a source voltage. Consequently, the electric charge-retention properties are improved to realize a liquid crystal display 100 that can display at a high contrast ratio. in FIG. 2, the common electrodes 9a are drawn as wiring extending from the scanning line-driving circuit 104. The common electrodes 9a are maintained at a predetermined voltage level. Furthermore, the common electrodes 9a may be provided to only the pixel regions 100a in being connected to constant potential lines or may be provided to approximately the entire face of the element substrate 10, as in an FFS mode.

Detail Configuration of Each Pixel

Figure 3A:
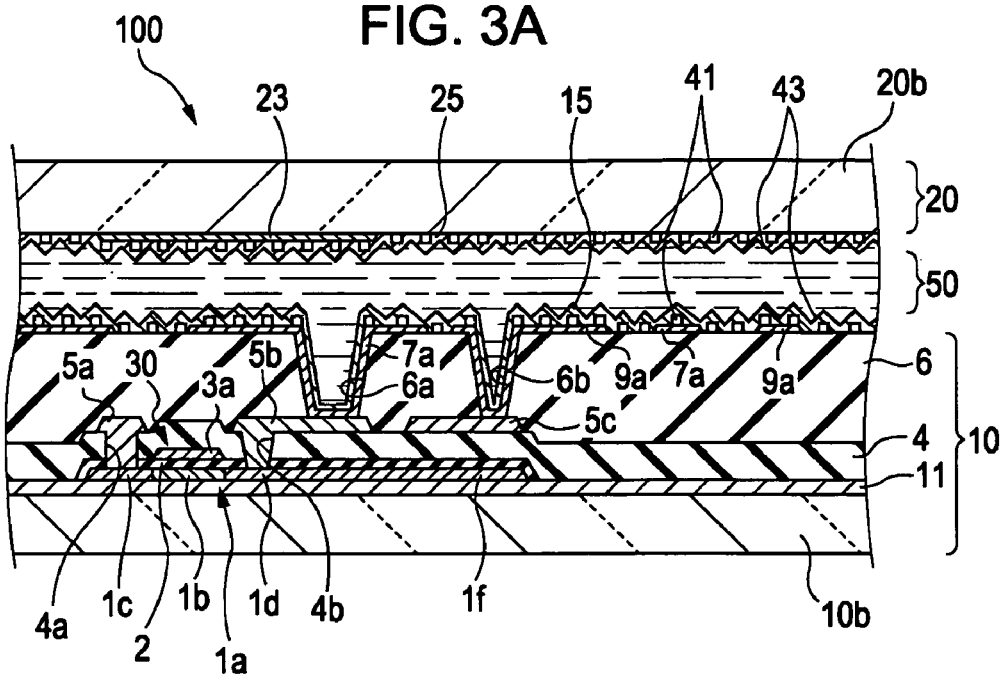
FIG. 3A is a cross-sectional view of a pixel of an IPS mode liquid crystal device to which the invention is applied.

FIG. 3A is a cross-sectional view of a pixel of an IPS mode liquid crystal device 100 to which the invention is applied.

Figure 3B:
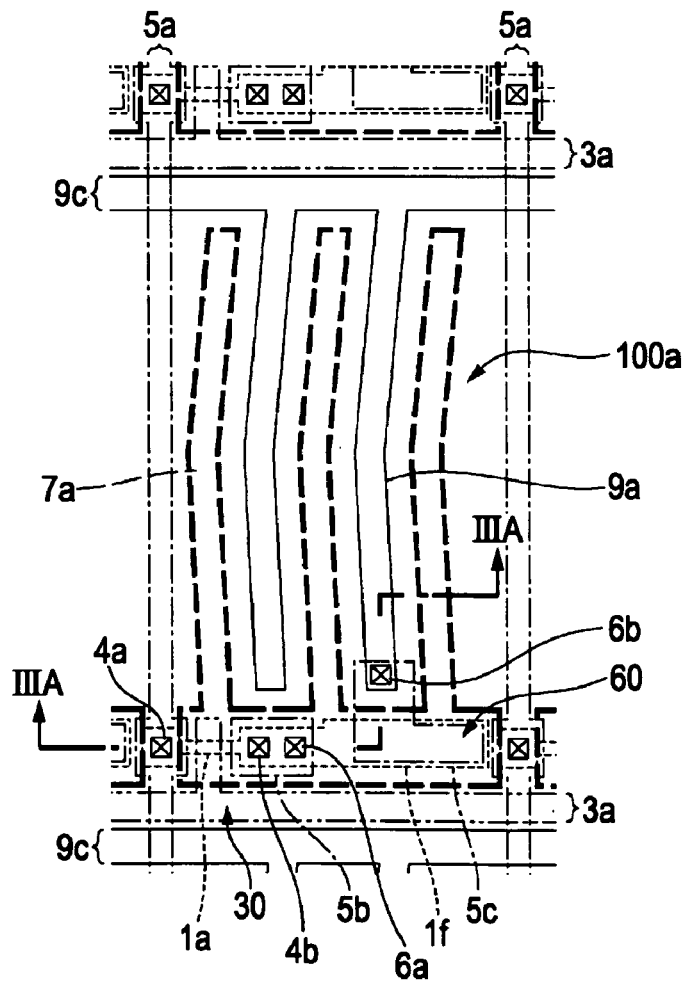
FIG. 3B is a plan view of the pixels adjacent to each other on an element substrate.

FIG. 3B is a plan view of the pixels adjacent to each other on an element substrate 10. FIG. 3A is a cross-sectional view of the liquid crystal device 100 taken along the line IIIA-IIIA of FIG. 3B. in FIG. 3B, the pixel electrodes 7a are indicated by a long thick dotted line, the data lines 5a and a thin film which is formed simultaneously with the formation of the data lines 5a are indicated by an alternate long and short dashed line, the scanning lines 3a are indicated by a chain double-dashed line, and the common electrodes 9a are indicated by a thin solid line.

In FIGS. 3A and 3B, the base body of the element substrate 10 is a transparent plate 10b such as a quartz plate or a heat-resistant glass plate. The base body of the counter substrate 20 is a transparent plate 20b such as a quartz plate or a heat-resistant glass plate. On the element substrate 10, a plurality of transparent pixel electrodes 7a (regions surrounded by a long thick dotted line) are disposed for each pixel 100a in a matrix form, and the data lines 5a (indicated by an alternate long and short dashed line) and scanning lines 3a (indicated by a chain double-dashed line) are disposed along the longitudinal and lateral boundary regions of the pixels 10a.

The element substrate 10 includes a silicon oxide film 11 disposed on the surface of the transparent plate 10b, and a thin-film transistor 30 with a top-gate structure is formed at the surface side of the silicon oxide film 11. The thin-film transistor 30 has a structure including a channel-forming region 1b, a source region 1c, and a drain region ld for an island-like semiconductor film la. The thin-film transistor 30 may have an LDD (Lightly Doped Drain) structure including low concentration regions at both sides of the channel-forming region 1b. in this embodiment, the element substrate 10 is an SOI (Silicon On insulator) substrate, and the semiconductor film la is made of single crystal silicon. in a case that the transparent plate 10b is a glass plate, the semiconductor film la is a polysilicon film formed by forming an amorphous silicon film to the element substrate 10 and then polycrystallizing the amorphous silicon film by laser annealing or lamp annealing.

Furthermore, a gate insulating film 2 is formed in the upper layer of the semiconductor film la by heat oxidation of the semiconductor film la, and a part of the scanning line 3a lies on the gate insulating film 2, as a gate electrode. The upper layer of the gate electrode (scanning line 3a) is an interlayer insulating film 4 of a silicon oxide film, a silicon nitride film, or a lamination film thereof. in a case that the transparent plate 10b is a glass plate, the gate insulating film 2 is a silicon oxide film or a silicon nitride film formed by CVD. The data line 5a is formed on the surface of the interlayer insulating film 4 and is electrically connected to the source region 1c through a contact hole 4a formed in the interlayer insulating film 4. A drain electrode 5b is formed on the surface of the interlayer insulating film 4 and is electrically connected to the drain region ld through a contact hole 4b formed in the interlayer insulating film 4. Furthermore, the upper layer of the data line 5a and the drain electrode 5b is an interlayer insulating film 6 of a silicon oxide film, a silicon nitride film, or a lamination film thereof. The interlayer insulating film 6 may be a planarized film made of a photosensitive resin.

On the surface of the interlayer insulating film 6, the pixel electrode 7a of an ITO (indium Tin Oxide) film is formed. The pixel electrode 7a is electrically connected to the drain electrode 5b through a contact hole 6a formed in the interlayer insulating film 6. The drain electrode 5b is electrically connected to the drain region id through the contact hole 4b formed in the interlayer insulating film 4 and the gate insulating film 2.

In this embodiment, the liquid crystal device 100 employs an IPS mode. Accordingly, the pixel electrodes 7a are formed in a comb-like shape. The element substrate 10 includes common potential lines 9c extending in parallel to the scanning lines 3a. in the pixel region 100a, the comb-like common electrodes 9a of an ITO film extend from the common potential line 9c so as to face the pixel electrodes 7a. in this embodiment, the common electrodes 9a and the common potential line 9c are integrally formed. Alternatively, the common electrodes 9a and the common potential line 9c may be made of different conductive films and be electrically connected to each other. in both cases, the liquid crystal 50 can be driven by a lateral electric field formed between the comb-like pixel electrodes 7a and the comb-like common electrodes 9a.

The element substrate 10 includes an alignment layer 15, which will be described below with reference to FIG. 4; formed on the surface side of the common electrodes 9a. The counter substrate 20 includes a light-shielding film 23a called a black matrix and an alignment layer 25, which will be described below with reference to FIG. 4, formed on the surface side of the light-shielding film 23a.

In the structure shown in FIGS. 3A and 3B, the storage capacitance 60 is formed by forming an extending portion lf (lower electrode of the storage capacitance 60) to the semiconductor film la and simultaneously forming an upper electrode 5c of the storage capacitance 60 and the data line 5a in the upper layer of the interlayer insulating film 4. The common electrodes 9a are electrically connected to the upper electrode 5c through a contact hole 6b formed in the interlayer insulating film 6.

Figure 4A:
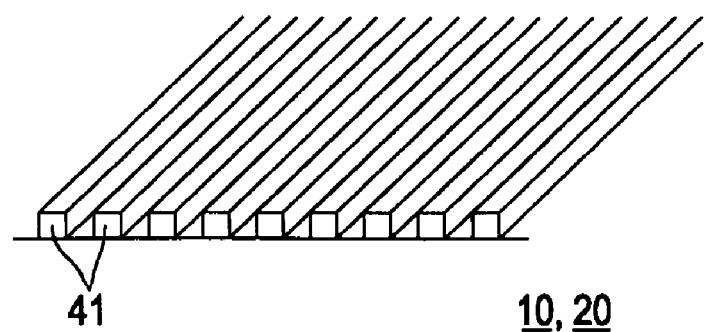
FIGS. 4A, 4B, and 4C are explanatory diagrams of an alignment layer used in a liquid crystal device to which the invention is applied.
Figure 4B:
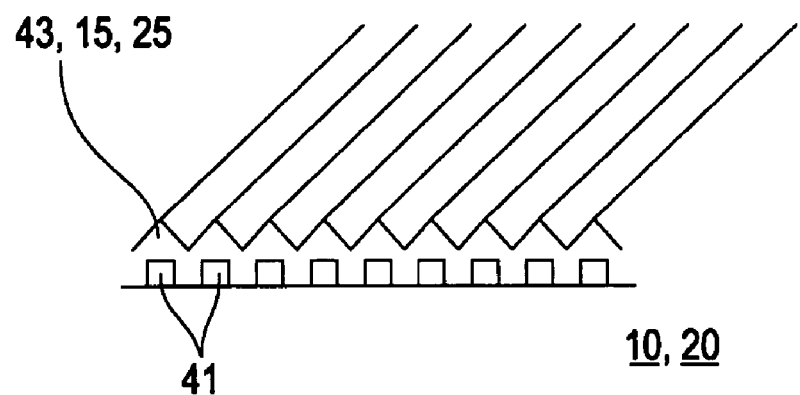
Figure 4C:
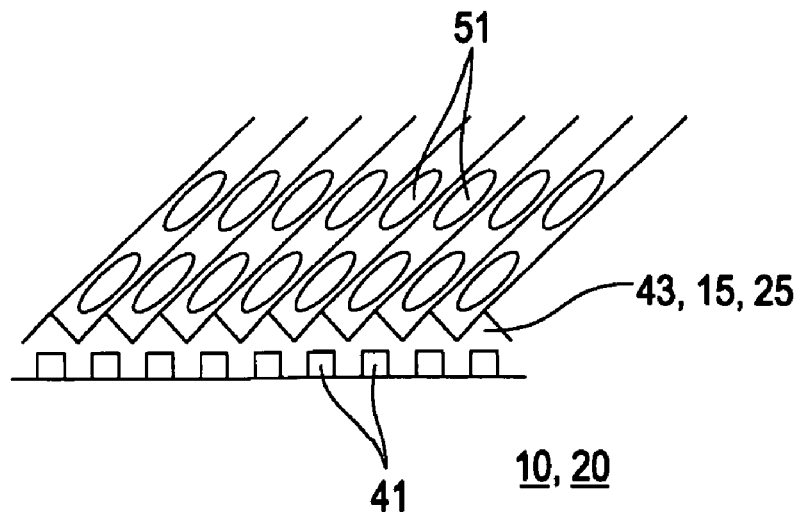

When the thus formed liquid crystal device 100 is used in a projection display system (liquid crystal projector), for example, three liquid crystal devices 100 are used as light valves for RGB. Each color light decomposed by a dichroic mirror for RGB color decomposition enters each of the liquid crystal devices 100, respectively, as incident light. in such a case, the liquid crystal devices 100 are not provided with color filters. On the other hand, when color filters for RGB are formed together with protecting films thereof in regions of the counter substrate 20 so as to correspond to each pixel 100a, the liquid crystal device 100 can be used as a color display of an electronic apparatus, such as a mobile computer, a mobile phone, or a liquid-crystal television, which are described below, in addition to the projection display system. Structure of alignment layer and effect thereof FIGS. 4A to 4C are diagrams illustrating an alignment layer used in the liquid crystal device according to this embodiment. As shown in FIG. 4B, in the liquid crystal device 100 of this embodiment, a plurality of linearly arranged base films 41 are formed as a base layer, and then an oxide film 43 having wedge-shaped tops 42 (over protrusions of the base films 41) is formed over the base layer. This oxide film 43 constitutes the alignment layer 15 or 25. Here, the base films 41 have a rectangular cross-section with a width of several tens nanometers. The distance between the base films 41 is several tens nanometers. The thickness of the oxide film 43 is, for example, several tens to several hundreds nanometers.

In order to prepare the alignment films 15 and 25 in such a shape described above, in a first process, a plurality of linearly arranged base films 41 are formed as shown in FIG. 4A by forming a silicon oxide film on each surface of the element substrate 10 and the counter substrate 20 and patterning the silicon oxide film by a photolithography technique.

Then, in a second process, a silicon oxide film 43 is formed so as to cover the layer of the base films 41 as shown in FIG.

4B by an HDPCVD method. in this step, a raw material compound such as silane or tetraethoxysilane is used together with an argon or oxygen gas to synthesize silicon oxide from the raw material compound at a high plasma density, for example, an electron density of $1\times10^9$ to $5\times10^{10}$/cm$^3$. This synthesized oxide is deposited as a silicon oxide film 43. in this step, the deposited silicon oxide film 43 is partially etched by plasma simultaneously with the deposition of the silicon oxide film 43. Consequently, the silicon oxide film 43 is deposited over and between the base films 41 by forming the silicon oxide film 43 so as to cover the linearly formed base films 41. Furthermore, oblique faces are formed by scraping corners of tops of the oxide film protruding upward compared to the periphery. As a result, the silicon oxide film 43 having wedge-shaped tops 42 over the base films 41 is formed. This silicon oxide film 43 constitutes the alignment layer 15 or 25.

Here, the shape of each of the alignment layers 15 and 25 can be surely controlled by conditions for forming a film by the HDPCVD method and a formation pattern of the base films 41. Accordingly, as shown in FIG. 4C, the alignment direction of liquid crystal molecules 51 can be surely controlled, and also the pretilt angle can be surely controlled. Therefore, the viewing angle characteristics and the contrast of the liquid crystal device 100 can be improved. in particular, in this embodiment, since the liquid crystal device 100 is constituted as an IPS mode, black luminance in the horizontal and vertical directions and in the oblique direction is increased with the pretilt angle of the liquid crystal molecules 51. However, since the surfaces of the alignment layers 15 and 25 are rough and the shapes thereof can be surely controlled according to this embodiment, the pretilt angle can be surely controlled to be small. Therefore, the IPS mode liquid crystal device 100 can be improved in the viewing angle characteristics and the contrast of an image.

Furthermore, the silicon oxide film 43 (alignment layers 15 and 25) formed by the HDPCVD method is not deteriorated, unlike organic films. in addition, the silicon oxide film 43 is non-porous, unlike alignment layers made of inorganic materials formed by oblique deposition or ion-beam synthesis. Therefore, the reliability of the liquid crystal device 100 can be improved. Application to FFS mode liquid crystal device In the above embodiment, the invention is applied to an IPS mode liquid crystal device 100 in which the pixel electrodes 7a and the common electrodes 9a are disposed on the interlayer insulating film 6. This embodiment will describe an example that the invention is applied to an FFS mode liquid crystal device in which the alignment of the liquid crystal molecules is similarly controlled by an electric field in the lateral direction.

Figure 5A:
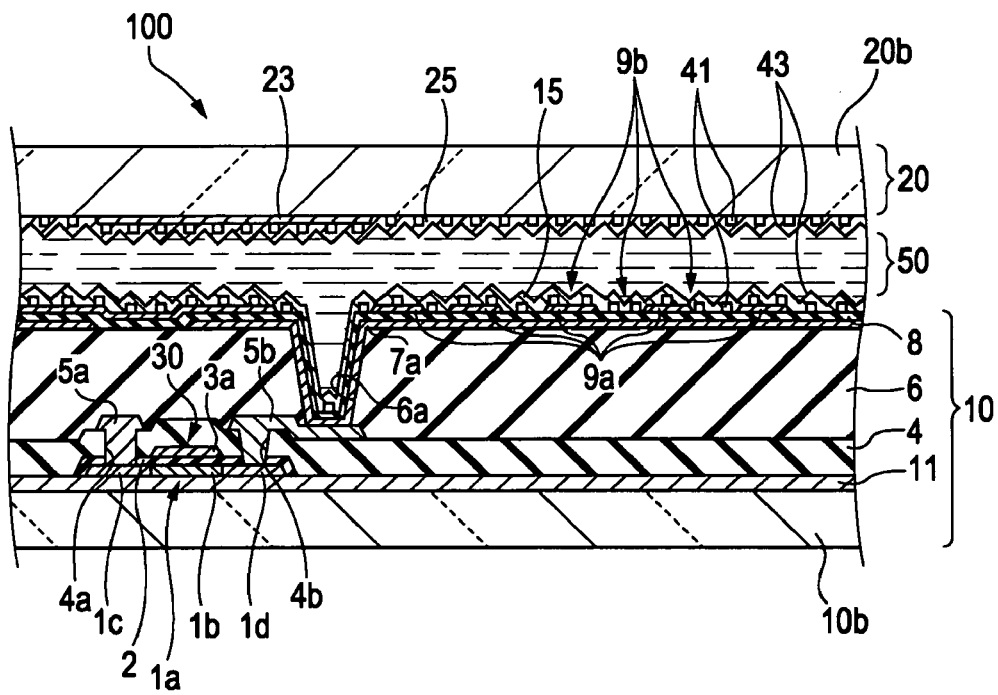
FIG. 5A is a cross-sectional view of a pixel of an FFS mode liquid crystal device to which the invention is applied.
Figure 5B:
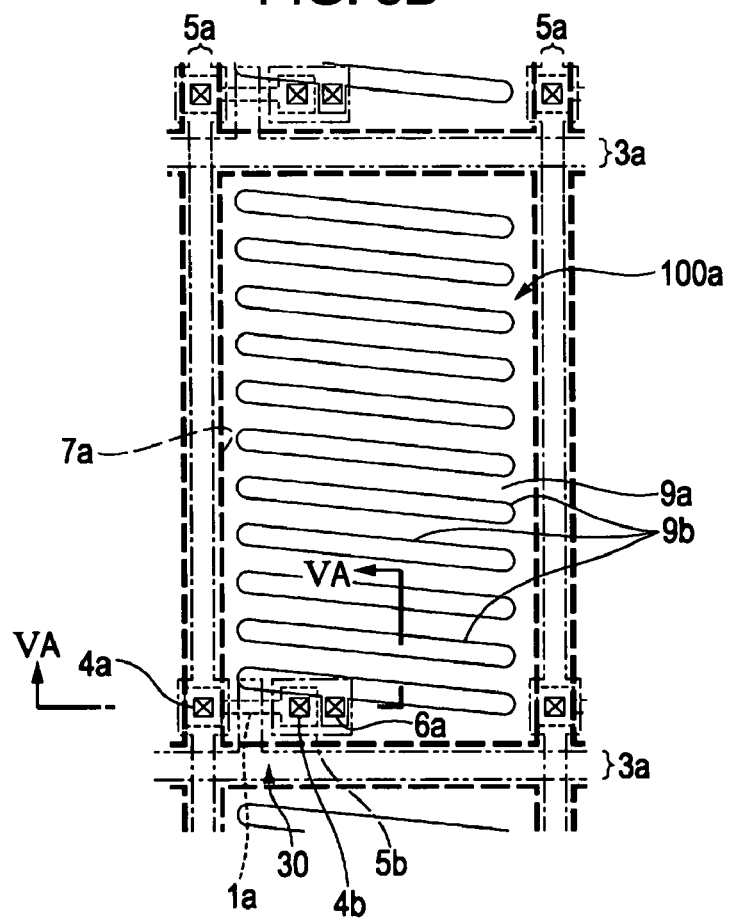
FIG. 5B is a plan view of the pixels adjacent to each other on an element substrate.

FIG. 5A is a cross-sectional view of a pixel of an FFS mode liquid crystal device 100 to which the invention is applied, and FIG. 5B is a plan view of the pixels adjacent to each other on an element substrate 10. FIG. 5A is a cross-sectional view of the liquid crystal device 100 taken along the line VA-VA of FIG. 5B. in FIG. 5B, the pixel electrode 7a is indicated by a long thick dotted line, the data lines 5a and a thin film which is formed simultaneously with the formation of the data lines 5a are indicated by an alternate long and short dashed line, the scanning lines 3a are indicated by a chain double-dashed line, and the common electrode 9a is indicated by a thin solid line. Furthermore, since the basic structure of this embodiment is the same as that of the IPS mode liquid crystal device 100, portions having the same functions as those of the IPS mode device are indicated by the same reference numerals in the drawings and the descriptions thereof are omitted.

In FIGS. 5A and 5B, a silicon oxide film 11 is disposed on a transparent plate 10b as the base body of the element substrate 10, and a thin-film transistor 30 is formed at the surface side of the silicon oxide film 11. Data lines 5a and drain electrodes 5b are disposed on the surface of an interlayer insulating film 4. in the upper layer of the data lines 5a and the drain electrodes 5b, an interlayer insulating film 6 made of a silicon oxide film, a silicon nitride film, or a lamination film thereof is disposed. On the surface of the interlayer insulating film 6, a pixel electrode 7a made of an ITO film is disposed. The pixel electrode 7a is electrically connected to the drain electrode 5b through a contact hole 6a provided in the interlayer insulating film 6. The drain electrode 5b is electrically connected to a drain region id through a contact hole 4b provided in the interlayer insulating film 4 and a gate insulating film 2.

In this embodiment, the liquid crystal device 100 is constituted as an FFS mode. Accordingly, an interelectrode insulating film 8 is disposed on the pixel electrodes 7a. A common electrode 9a made of an ITO film is disposed on the interelectrode insulating film 8 so as to cover approximately the entire face of the interelectrode insulating film 8. Here, the common electrode 9a is provided with a plurality of slit-like openings 9b (indicated by a solid line) and hence functions as counter electrodes for the pixel electrode 7a at the edges of the slit-like openings 9b. The common electrode 9a opposes the pixel electrode 7a with the interelectrode insulating film 8 therebetween to form a storage capacitance 60 between with the pixel electrode 7a. in the thus constituted liquid crystal device 100, liquid crystal 50 is driven by a lateral electric field formed between the pixel electrode 7a and the common electrode 9a through the slit-like openings 9b.

Also in this embodiment, the element substrate 10 and the counter substrate 20 are provided with the alignment layers 15 and 25, respectively. The alignment films 15 and 25 are formed, as described with reference to FIGS. 4A to 4C, by forming a plurality of linearly arranged base films 41 having a rectangular cross-section as a base layer and then forming a silicon oxide film 43 so as to cover the base films 41 by an HDPCVD method. As a result, the silicon oxide film 43 having wedge-shaped tops 42 is formed over the base films 41, and thus formed silicon oxide film 43 constitutes the alignment layer 15 or 25.

The liquid crystal device 100 is thus constituted as an FFS mode, and thereby black luminance in the horizontal and vertical directions and in the oblique direction is increased with the pretilt angle of the liquid crystal molecules 51. However, since the surfaces of the alignment layers 15 and 25 are rough and the shapes thereof can be surely controlled according to this embodiment, the pretilt angle can be surely controlled to be small. Therefore, the FFS mode liquid crystal device 100 can be improved in the viewing angle characteristics and the contrast of an image. Thus, the same effects as those in the above embodiment of the IPS mode are achieved.

Other Embodiment

In the above embodiments, a plurality of linearly arranged base films 41 are formed as the base layer having alternating linear grooves and linear protrusions, but a film provided having alternating linear grooves and linear protrusions on only the upper face thereof may be used as the base layer. That is, the base layer may be formed by forming a base film and then forming linear grooves and linear protrusions on the surface thereof by roughening treatment.

In the above-described embodiments, single crystal silicon is used as the semiconductor film, but the invention may be applied to an element substrate 10 including a polysilicon or amorphous silicon film. Furthermore, the invention may be applied to a liquid crystal device using a thin-film diode element (non-linear element) as a pixel switching element.

Mounting Example on Electronic Apparatus

Figure 6A:
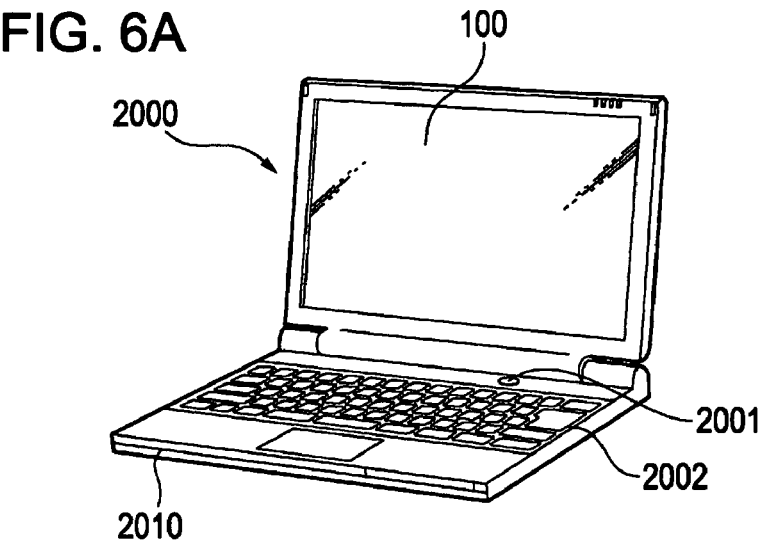
FIGS. 6A, 6B, and 6C are explanatory diagrams of electronic apparatuses using liquid crystal devices according to the invention.
Figure 6B:
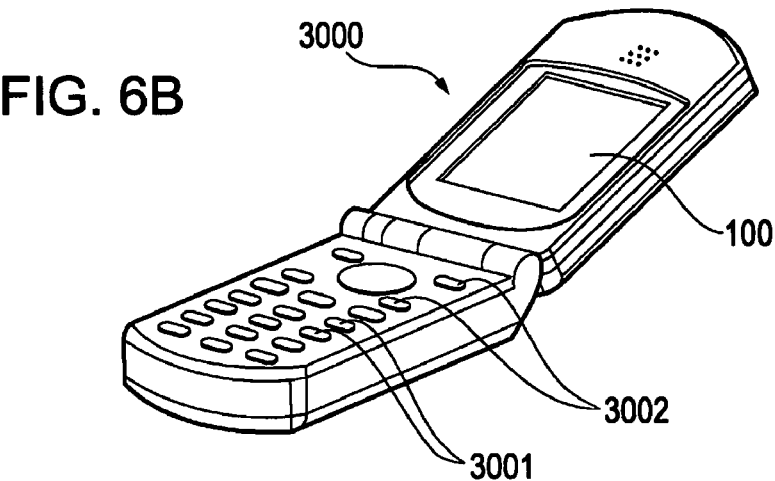
Figure 6C:
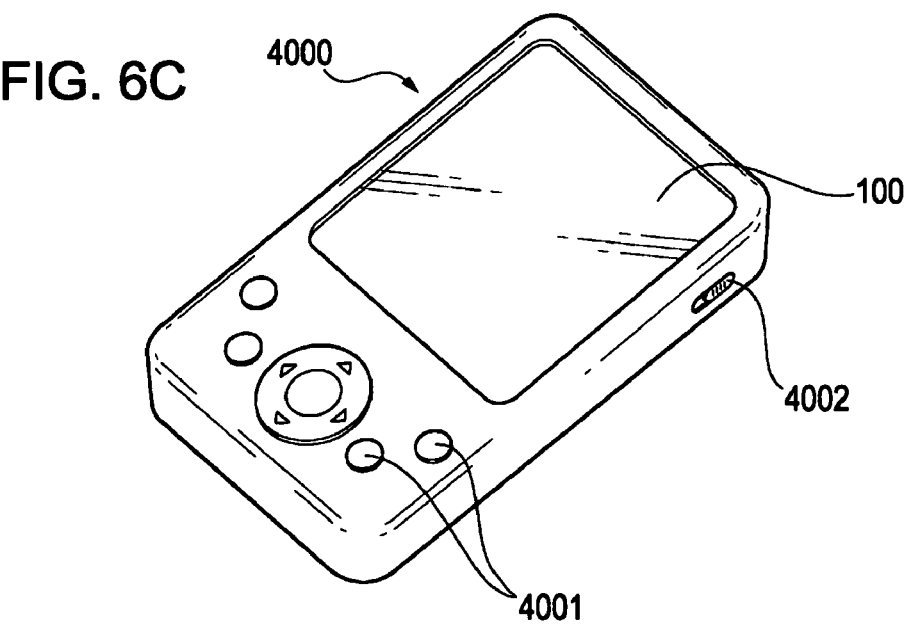

Next, an electronic apparatuses to which liquid crystal devices 100 according to the above-mentioned embodiment are applied will be described. FIG. 6A shows the structure of a mobile personal computer having a liquid crystal device 100. The personal computer 2000 includes the liquid crystal device 100 as a display unit and a body portion 2010. The body portion 2010 includes a power switch 2001 and a key board 2002. FIG. 6B shows the structure of a mobile phone having a liquid crystal device 100. The mobile phone 3000 includes a plurality of operation buttons 3001, scroll buttons 3002, and the liquid crystal device 100 as a display unit. The image displayed on the liquid crystal device 100 is scrolled by operating the scroll buttons 3002. FIG. 6C shows the structure of a PDA (personal digital assistant) to which a liquid crystal device 100 is applied. The PDA 4000 includes a plurality of operation buttons 4001, a power switch 4002, and the liquid crystal device 100 as a display unit. Various types of information such as addresses or schedules are displayed on the liquid crystal device 100 by operating the power switch 4002.

Examples of the electronic apparatus to which the liquid crystal device 100 is applied include, in addition to apparatuses shown in FIGS. 6A to 6C, a digital still camera, a liquid-crystal television, a viewfinder, a monitor direct-viewing-type videotape recorder, a vehicle navigation device, a pager, an electronic diary, a portable calculator, a word processor, a workstation, a television phone, a POS terminal, and apparatuses equipped with touch panels. The above-described liquid crystal device 100 can be applied to these various electronic apparatuses as a display.

Application Example to Projection Display System

Next, as an embodiment of an electronic apparatus according to the invention, a projector to which the above-described liquid crystal device 100 is applied as liquid crystal light valves will be described with reference to a drawing.

Figure 7:
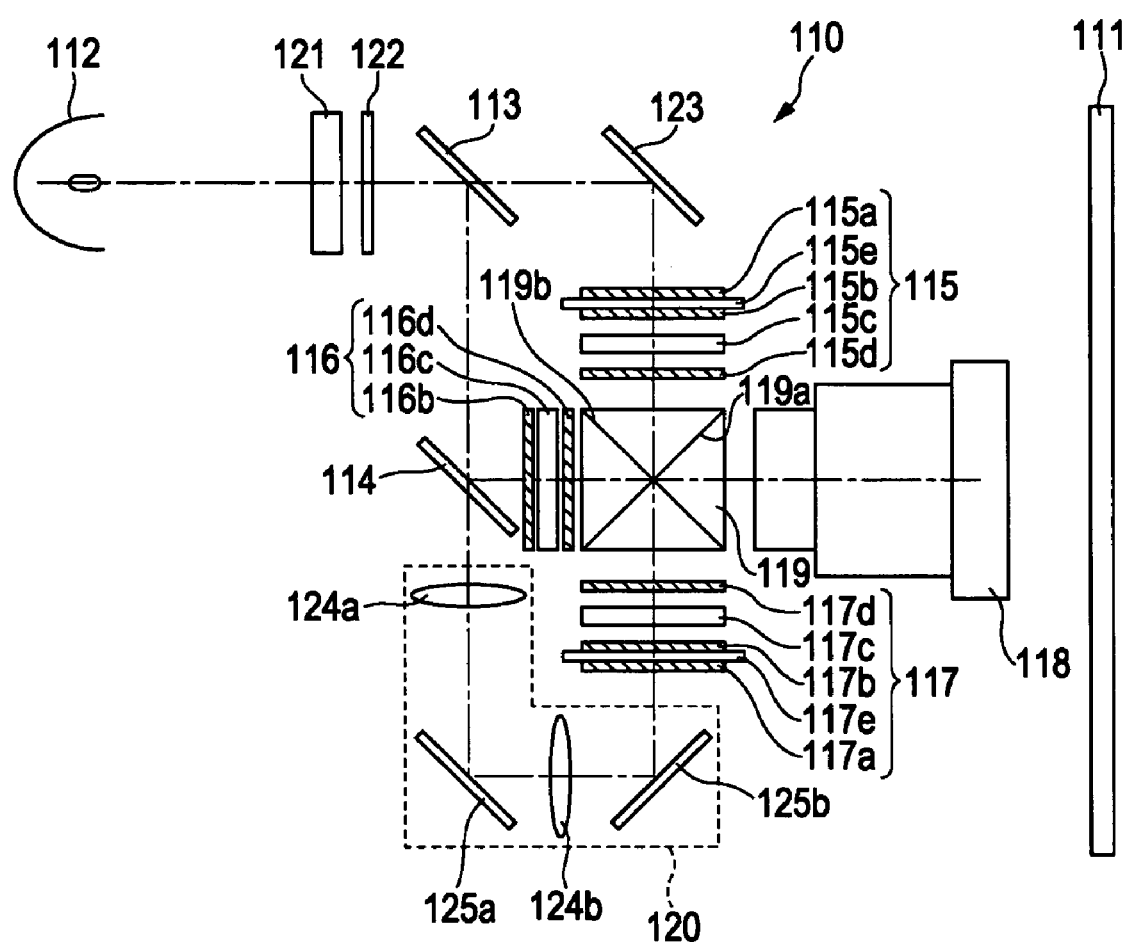
FIG. 7 is a schematic configuration diagram of a projector using a liquid crystal device according to the invention.

FIG. 7 is a schematic configuration diagram of a projector. The projector 110 is a so-called projective projector in which a screen 111 disposed on a viewer side is irradiated with light and the light reflected by this screen 111 is viewed. The projector 110 includes a light source 112, a dichroic mirrors 113 and 114, liquid crystal light valves 115 to 117 (liquid crystal devices 100), a projection optical system 118, a cross dichroic prism 119, and a relay system 120.

The light source 112 is constituted by an ultra-high pressure mercury lamp for supplying light containing red, green, and blue light components. The dichroic mirror 113 transmits red light from the light source 112 and reflects green and blue light. The dichroic mirror 114 transmits the blue light of the green and blue light reflected by the dichroic mirror 113 and reflects the green light. Thus, the dichroic mirrors 113 and 114 constitute a color-separation optical system for separating the light emitted from the light source 112 into red light, green light, and blue light.

Here, an integrator 121 and a polarization conversion element 122 are disposed between the light source 112 and the dichroic mirror 113 in this order from the light source 112 side. The integrator 121 equalizes the illumination distribution of light emitted from the light source 112. The polarization conversion element 122 converts light from the light source 112 into polarized light with a specific vibration direction, such as s-polarized light.

The liquid crystal light valve 115 is a transmission liquid crystal device (electrooptical device) for modulating the red light passing through the dichroic mirror 113 and reflected by a reflection mirror 123 according to an image signal. The liquid crystal light valve 115 includes a $\lambda/2$ phase difference plate 115a, a first polarizing plate 115b, a liquid crystal panel 115c, and a second polarizing plate 115d. Here, though the red light that enters the liquid crystal light valve 115 passes through the dichroic mirror 113, the polarization of the red light is not changed. Therefore, the s-polarization state is maintained.

The $\lambda/2$ phase difference plate 115a is an optical element for converting the s-polarized light that entered the liquid crystal light valve 115 into p-polarized light. The first polarizing plate 115b is a polarizing plate that interrupts s-polarized light and transmits p-polarized light. The liquid crystal panel 115c converts the p-polarized light into s-polarized light (in a grayscale, circularly or elliptically polarized light) by modulation according to an image signal. Furthermore, the second polarizing plate 115d is a polarizing plate that interrupts p-polarized light and transmits s-polarized light. Consequently, the liquid crystal light valve 115 has a structure for modifying red light according to an image signal and emitting the modified red light toward the cross dichroic prism 119.

Furthermore, a transparent glass plate 115e not converting polarization is disposed between the $\lambda/2$ phase difference plate 115a and the first polarizing plate 115b so as to be in contact therewith, and thereby the $\lambda/2$ phase difference plate 115a and the first polarizing plate 115b are prevented from being deformed by heat.

The liquid crystal light valve 116 is a transmission liquid crystal device for modifying the green light reflected by the dichroic mirror 113 and then by the dichroic mirror 114, according to an image signal. The liquid crystal light valve 116, similarly to the liquid crystal light valve 115, includes a first polarizing plate 116b, a liquid crystal panel 116c, and a second polarizing plate 116d. The green light that enters the liquid crystal light valve 116 is s-polarized light reflected by the dichroic mirrors 113 and 114. The first polarizing plate 116b is a polarizing plate that interrupts p-polarized light and transmits s-polarized light. The liquid crystal panel 116c converts the s-polarized light into p-polarized light (in a grayscale, circularly or elliptically polarized light) by modulation according to an image signal. Furthermore, the second polarizing plate 116d is a polarizing plate that interrupts s-polarized light and transmits p-polarized light. Consequently, the liquid crystal light valve 116 has a structure for modifying green light according to an image signal and emitting the modified green light toward the cross dichroic prism 119.

The liquid crystal light valve 117 is a transmission liquid crystal device for modifying the blue light reflected by the dichroic mirror 113 and transmitted through the dichroic mirror 114 and then passing through the relay system 120, according to an image signal. The liquid crystal light valve 117, similarly to the liquid crystal light valves 115 and 116, includes a $\lambda/2$ phase difference plate 117a, a first polarizing plate 117b, a liquid crystal panel 117c, and a second polarizing plate 117d. Here, the blue light that enters the liquid crystal light valve 117 is reflected by the dichroic mirror 113, transmitted through the dichroic mirror 114, and then reflected by two reflection mirrors 125a and 125b, which is described below, of the relay system 120, and thereby is s-polarized light.

The $\lambda/2$ phase difference plate 117a is an optical element for converting the s-polarized light that entered the liquid crystal light valve 117 into p-polarized light. The first polarizing plate 117b is a polarizing plate that interrupts s-polarized light and transmits p-polarized light. The liquid crystal panel 117c converts the p-polarized light into s-polarized light (in a grayscale, circularly or elliptically polarized light)

by modulation according to an image signal. Furthermore, the second polarizing plate 117*d* is a polarizing plate that interrupts p-polarized light and transmits s-polarized light. Consequently, the liquid crystal light valve 117 has a structure for modifying blue light according to an image signal and emitting the modified blue light toward the cross dichroic prism 119. A glass plate 117*e* is disposed between the λ/2 phase difference plate 117*a* and the first polarizing plate 117*b* so as to be in contact therewith.

The relay system 120 includes relay lenses 124*a* and 124*b* and the reflection mirrors 125*a* and 125*b*. The relay lenses 124*a* and 124*b* are provided for preventing a loss in light intensity of the blue light of which light-path is long. The relay lens 124*a* is disposed between the dichroic mirror 114 and the reflection mirror 125*a*. The relay lens 124*b* is disposed between the reflection mirrors 125*a* and 125*b*. The reflection mirror 125*a* is disposed so as to reflect the blue light transmitted through the dichroic mirror 114 and emitted from the relay lens 124*a* toward the relay lens 124*b*. The reflection mirror 125*b* is disposed so as to reflect the blue light emitted from the relay lens 124*b* toward the liquid crystal light valve 117.

The cross dichroic prism 119 is a color synthesis optical system including two dichroic films 119*a* and 119*b* that are arranged to cross orthogonal to each other in an X-letter shape. The dichroic film 119*a* is a film that reflects blue light and transmits green light. The dichroic film 119*b* is a film that reflects red light and transmits green light. Accordingly, the cross dichroic prism 119 is constituted to compose the red light, green light, and blue light modified by the liquid crystal light valves 115 to 117, respectively, and emit the composed light toward the projection optical system 118.

The light that enters the cross dichroic prism 119 from the liquid crystal light valves 115 and 117 is s-polarized light. The light that enters the cross dichroic prism 119 from the liquid crystal light valve 116 is p-polarized light. Thus, since the light that enters the cross dichroic prism 119 has different types of polarization, the incident light from the liquid crystal light valves 115 to 117 can be effectively composed in the cross dichroic prism 119. in general, the dichroic films 119*a* and 119*b* are excellent in reflection properties for s-polarized light. Accordingly, red light and blue light that are reflected by the dichroic films 119*a* and 119*b* are converted so as to enter the cross dichroic prism 119 in an s-polarization state, and green light that is transmitted through the dichroic films 119*a* and 119*b* is converted so as to enter the cross dichroic prism 119 in a p-polarization state. The projection optical system 118 includes a projection lens (not shown) and is constituted so as to project the light composed in the cross dichroic prism 119 on the screen 111.

The entire disclosure of Japanese Patent Application No. 2007-040427, filed Feb. 21, 2007 is expressly incorporated by reference herein.

What is claimed is:

1. A liquid crystal device comprising:
    a first substrate;
    a second substrate;
    a liquid crystal held between the first substrate and the second substrate;
    a base layer provided on both the first substrate and the second substrate, each base layer having alternating linear grooves and linear protrusions; and
    an alignment layer of an oxide film covering each base layer, each alignment layer having wedge-shaped tops over the linear protrusions of each base layer.

2. The liquid crystal device according to claim 1, wherein each alignment layer is formed by high-density plasma chemical vapor deposition.

3. The liquid crystal device according to claim 1, wherein each base layer is a plurality of linearly arranged base films having a rectangular cross-section.

4. The liquid crystal device according to claim 1, wherein the first substrate includes pixel electrodes and a common electrode disposed on one insulating film; and
    the alignment of liquid crystal molecules is controlled by a lateral electric field between the pixel electrodes and the common electrode.

5. The liquid crystal device according to claim 1, wherein the first substrate includes a pixel electrode and a common electrode disposed in different layers with an insulating film interposed therebetween; and
    the alignment of liquid crystal molecules is controlled by a lateral electric field between the pixel electrode and the common electrode.

* * * * *